United States Patent
Simon et al.

(10) Patent No.: US 9,851,727 B2
(45) Date of Patent: Dec. 26, 2017

(54) COORDINATED CONTROL OF HVAC SYSTEM USING AGGREGATED SYSTEM DEMAND

(71) Applicant: Carrier Corporation, Farmington, CT (US)

(72) Inventors: Emile C. Simon, Cork (IE);
Konstantinos Kouramas, Cork (IE);
Kushal Mukherjee, Cork (IE); Marcin T. Cychowski, Cork (IE)

(73) Assignee: CARRIER CORPORATION, Farmington, CT (US)

( * ) Notice: Subject to any disclaimer, the term of this patent is extended or adjusted under 35 U.S.C. 154(b) by 272 days.

(21) Appl. No.: 14/723,911

(22) Filed: May 28, 2015

(65) Prior Publication Data
US 2016/0349772 A1     Dec. 1, 2016

(51) Int. Cl.
*G06F 19/00* (2011.01)
*G05D 23/19* (2006.01)
(Continued)

(52) U.S. Cl.
CPC ...... *G05D 23/1917* (2013.01); *F24F 11/0086* (2013.01); *G05B 15/02* (2013.01);
(Continued)

(58) Field of Classification Search
USPC .......................................................... 700/276
See application file for complete search history.

(56) References Cited

U.S. PATENT DOCUMENTS 4,843,084 A * 6/1989 Parker ................ G05D 23/1917
                                                   165/205
5,144,812 A * 9/1992 Mills, Jr. .................. F24F 1/06
                                                    62/186
(Continued)

FOREIGN PATENT DOCUMENTS

EP        2607803 A2    6/2013
WO    2006034718 A1    4/2006
(Continued)

OTHER PUBLICATIONS

European Search Report for application EP 16171315.1, dated Oct. 10, 2016, 9 pages.
(Continued)

*Primary Examiner* — Kidest Bahta
(74) *Attorney, Agent, or Firm* — Cantor Colburn LLP

(57) ABSTRACT

A control system for an HVAC system having a plurality of HVAC components operably associated with one or more terminal units is provided. The control system includes a coordination module and a controller having a processor and a memory, the controller operably associated with the coordination module and in signal communication with the plurality of HVAC components. The controller is configured to determine an aggregated thermal demand of the HVAC system, determine, with the coordination module, an operational setpoint for at least one HVAC component of the plurality of HVAC components based on the determined aggregated thermal demand, and send a signal indicative of each determined operational setpoint to each associated HVAC component of the plurality of HVAC components.

10 Claims, 3 Drawing Sheets

(51) Int. Cl.
*F24F 11/00* (2006.01)
*G05B 15/02* (2006.01)

(52) U.S. Cl.
CPC .. *G05D 23/1934* (2013.01); *F24F 2011/0046* (2013.01); *F24F 2011/0067* (2013.01)

(56) References Cited

U.S. PATENT DOCUMENTS

| | | | |
|---|---|---|---|
| 6,033,302 | A | 3/2000 | Ahmed et al. |
| 6,066,843 | A | 5/2000 | Scheremeta |
| 6,095,426 | A | 8/2000 | Ahmed et al. |
| 6,145,751 | A * | 11/2000 | Ahmed ............... G05D 23/1919 165/208 |
| 6,792,766 | B2 | 9/2004 | Osborne et al. |
| 7,216,698 | B2 | 5/2007 | Catzel |
| 7,398,821 | B2 | 7/2008 | Rainer et al. |
| 7,644,869 | B2 | 1/2010 | Hoglund et al. |
| 7,774,102 | B2 * | 8/2010 | Butler .................... F24F 11/006 236/1 C |
| 7,894,943 | B2 | 2/2011 | Sloup |
| 7,992,630 | B2 | 8/2011 | Springer et al. |
| 8,406,929 | B2 | 3/2013 | Duncan |
| 8,554,376 | B1 | 10/2013 | Matsuoka et al. |
| 8,560,127 | B2 | 10/2013 | Leen et al. |
| 8,843,238 | B2 | 9/2014 | Wenzel et al. |
| 8,870,086 | B2 | 10/2014 | Tessier et al. |
| 8,977,405 | B2 | 3/2015 | Shiel |
| 9,002,481 | B2 | 4/2015 | Leen et al. |
| 9,002,526 | B2 | 4/2015 | Matsuoka et al. |
| 9,002,761 | B2 | 4/2015 | Montalvo |
| 9,020,647 | B2 | 4/2015 | Johnson |
| 9,057,649 | B2 | 6/2015 | Steinberg |
| 9,069,338 | B2 | 6/2015 | Drees |
| 9,121,628 | B2 | 9/2015 | Chen |
| 9,134,710 | B2 | 9/2015 | Cheung |
| 9,182,142 | B2 | 11/2015 | Wen |
| 9,189,751 | B2 | 11/2015 | Matsuoka |
| 2005/0087616 | A1 * | 4/2005 | Attridge ................ F24F 3/044 236/91 D |
| 2005/0159846 | A1 * | 7/2005 | Van Ostrand ...... G05B 23/0291 700/276 |
| 2010/0106319 | A1 * | 4/2010 | Grohman ............. F24F 11/0086 700/276 |
| 2011/0137468 | A1 | 6/2011 | Duncan |
| 2011/0155354 | A1 * | 6/2011 | Karamanos ............. F24F 3/052 165/121 |
| 2011/0211224 | A1 * | 9/2011 | Arita .................... G06K 15/022 358/1.15 |
| 2012/0031984 | A1 | 2/2012 | Feldmeier et al. |
| 2012/0259469 | A1 | 10/2012 | Ward et al. |
| 2012/2283881 | | 11/2012 | Federspiel |
| 2013/0151019 | A1 | 6/2013 | Federspiel |
| 2013/0153195 | A1 | 6/2013 | Wallaert |
| 2013/0261809 | A1 | 10/2013 | Morrow |
| 2014/0001846 | A1 | 1/2014 | Mosebrook et al. |
| 2014/0001977 | A1 | 1/2014 | Zacharchuk et al. |
| 2014/0096946 | A1 | 4/2014 | Rognli et al. |
| 2014/0158783 | A1 | 6/2014 | Fan |
| 2014/0229016 | A1 | 8/2014 | Shiflet |
| 2014/0249876 | A1 | 9/2014 | Wu et al. |
| 2014/0277760 | A1 | 9/2014 | Marik et al. |
| 2014/0316584 | A1 | 10/2014 | Matsuoka |
| 2014/0365017 | A1 | 12/2014 | Hanna et al. |
| 2015/0045962 | A1 | 2/2015 | Wenzel et al. |
| 2015/0102120 | A1 | 4/2015 | Sörensen |
| 2015/0178865 | A1 | 6/2015 | Anderson |
| 2015/0192911 | A1 | 7/2015 | Sloop |
| 2015/0198345 | A1 | 7/2015 | Bicknell |
| 2015/0226446 | A1 | 8/2015 | Dempster |
| 2015/0233594 | A1 | 8/2015 | Abe |
| 2015/0247646 | A1 | 9/2015 | Song |
| 2015/0253027 | A1 | 9/2015 | Lu |

FOREIGN PATENT DOCUMENTS

| | | |
|---|---|---|
| WO | 2007042371 A1 | 4/2007 |
| WO | 2007096377 A1 | 8/2007 |
| WO | 2012112324 A1 | 8/2012 |
| WO | 2013182320 A1 | 12/2013 |
| WO | 2014051635 A1 | 4/2014 |
| WO | 2014144175 A1 | 9/2014 |
| WO | 2014153552 A1 | 9/2014 |
| WO | 2015013677 A2 | 1/2015 |
| WO | 2015049664 A1 | 4/2015 |
| WO | 2015077754 A1 | 5/2015 |
| WO | 2015087028 A1 | 6/2015 |

OTHER PUBLICATIONS

International Search Report and Written Opinion for PCT/US2016/065301, dated Mar. 24, 2017, 14pgs.

* cited by examiner

COORDINATED CONTROL OF HVAC SYSTEM USING AGGREGATED SYSTEM DEMAND

FIELD

The subject matter disclosed herein relates to HVAC systems and, more specifically, to control of HVAC system equipment.

BACKGROUND

In some known heating, ventilation, and air conditioning (HVAC) systems, equipment setpoints are typically fixed or weather compensated (i.e., determined based on outdoor air temperature) without any feedback from other systems. As such, the produced heating/cooling capacity may deviate from a building demand corresponding to a desired building comfort level. Similarly, the authority of the capacity production and distribution system, which is determined via its fluids flows/pressures and temperatures, may be unnecessarily high, so a lower authority could be sufficient to maintain the building comfort. The capacity deviations and the high authorities may result in increased energy consumption and cost.

Accordingly, it is desirable to provide a control system to improve HVAC system efficiency and maintain building comfort levels.

BRIEF DESCRIPTION

In one aspect, a control system for an HVAC system having a plurality of HVAC components operably associated with one or more terminal units is provided. The control system includes a coordination module and a controller having a processor and a memory, the controller operably associated with the coordination module and in signal communication with the plurality of HVAC components. The controller is configured to determine an aggregated thermal demand of the HVAC system, determine, with the coordination module, an operational setpoint for at least one HVAC component of the plurality of HVAC components based on the determined aggregated thermal demand, and send a signal indicative of each determined operational setpoint to each associated HVAC component of the plurality of HVAC components.

In addition to one or more of the features described above, or as an alternative, further embodiments may include: wherein the controller is configured to update the operational setpoints at predetermined time intervals; wherein the plurality of HVAC components comprises a capacity generation plant, a fluid circulation pump, and ventilation equipment; wherein the ventilation equipment comprises an air handling unit; wherein the coordination module includes a cooling mode module and a heating mode module; and/or wherein determining the aggregated thermal demand of the HVAC system comprises determining an aggregated thermal demand of the one or more terminal units.

In another aspect, an HVAC system is provided. The system includes a plurality of HVAC components, at least one terminal unit associated with each HVAC component of the plurality of HVAC components, a coordination module, and a controller having a processor and a memory, the controller operably associated with the coordination module and in signal communication with the plurality of HVAC components and associated terminal units. The controller is configured to determine an aggregated thermal demand of the HVAC system, determine, with the coordination module, an operational setpoint for at least one HVAC component of the plurality of HVAC components based on the determined aggregated thermal demand, and send a signal indicative of each determined operational setpoint to each associated HVAC component of the plurality of HVAC components.

In addition to one or more of the features described above, or as an alternative, further embodiments may include: wherein the controller is configured to update the operational setpoints at predetermined time intervals; wherein the plurality of HVAC components comprises a capacity generation plant, a fluid circulation pump, and ventilation equipment; wherein the ventilation equipment comprises an air handling unit; wherein the coordination module includes a cooling mode module and a heating mode module; and/or wherein determining the aggregated thermal demand of the HVAC system comprises determining an aggregated thermal demand of the one or more terminal units.

In yet another aspect, provided herein is a method of controlling an HVAC system having a plurality of HVAC components, at least one terminal unit associated with each HVAC component of the plurality of HVAC components, a coordination module, and a controller operably associated with the coordination module and in signal communication with the plurality of HVAC components and associated terminal units. The method includes determining an aggregated thermal demand of the HVAC system, determining, with the coordination module, an operational setpoint for at least one HVAC component of the plurality of HVAC components based on the determined aggregated thermal demand, and subsequently operating each HVAC component of the plurality of HVAC components at the determined operational setpoint.

In addition to one or more of the features described above, or as an alternative, further embodiments may include: updating the operational setpoints at predetermined time intervals; wherein the plurality of HVAC components comprises a capacity generation plant, a fluid circulation pump, and ventilation equipment; wherein the ventilation equipment comprises an air handling unit; wherein the coordination module includes a cooling mode sub-module and a heating mode sub-module; wherein the operational setpoint for the capacity generation plant is a water temperature, the operational setpoint for the pump is a water pressure, and the operational setpoint for the air handling unit is a supply air temperature; wherein said determining an aggregated thermal demand comprises determining an aggregated thermal demand of the one or more terminal units; and/or wherein said determining an aggregated thermal demand of the HVAC system comprises determining if the capacity generation plant is being operated in a cooling mode or a heating mode, measuring an air temperature of the zone, and dividing the product of the number of terminal units of the one or more terminal units operating in the cooling mode or the heating mode and the difference between a zone air temperature setpoint and a measured zone air temperature, by the total number of terminal units associated with the plurality of HVAC components.

BRIEF DESCRIPTION OF THE DRAWINGS

The foregoing and other features, and advantages of embodiments are apparent from the following detailed description taken in conjunction with the accompanying drawings in which.

DETAILED DESCRIPTION

Figure 1:
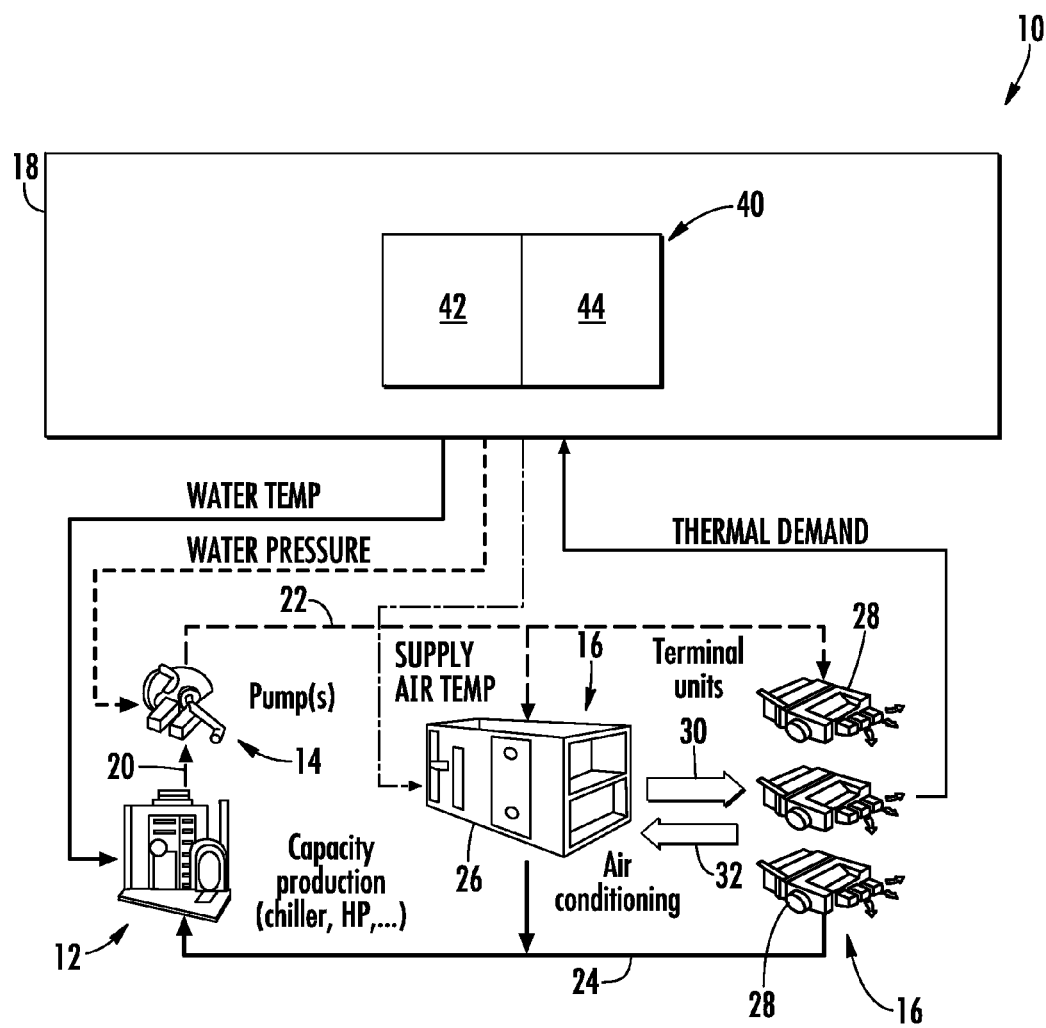
FIG. 1 is a schematic view of an exemplary HVAC system.

FIG. 1 illustrates an exemplary HVAC system 10 that generally includes a capacity generation plant 12, a fluid circulation pump 14, ventilation equipment 16, and a controller 18. Capacity generation plant 12 conditions (i.e., heats/cools) a heat transfer fluid such as water and supplies the conditioned fluid to pump 14 via a conduit 20. Pump 14 subsequently supplies the conditioned fluid to ventilation equipment 16 (via a supply conduit 22) where the conditioned fluid is utilized to condition air forced through ventilation equipment 16. The conditioned air is then used to adjust the temperature of a building or structure associated with HVAC system 10. The fluid is then returned to capacity generation plant 12 via a return conduit 24 where the fluid is re-conditioned. Controller 18 is configured to coordinate the operation of capacity generation plant 12, pump 14, and ventilation equipment 16 with a demand of the building to reduce energy consumption through improved system efficiency.

Capacity generation plant 12 may be, for example a heat pump, a chiller, or a boiler. However, capacity generation plant 12 may be any type of capacity generation plant that enables HVAC system 10 to function as described herein. Capacity generation plant 12 is configured to heat or cool a heat transfer fluid (e.g., water) to facilitate environmental conditioning of the buildings. As such, capacity generation plant 12 may be controlled to selectively adjust the temperature of the heat transfer fluid.

Fluid circulation pump 14 is configured to supply the heat transfer fluid from capacity generation plant 12 to ventilation equipment 16. Pump 14 may be controlled to selectively adjust the pressure (or flow) of the heat transfer fluid.

Ventilation equipment 16 may be any suitable equipment to supply conditioned air to selected zones or areas of the building. For example, in the illustrated embodiment, ventilation equipment 16 includes an air handling unit (AHU) 26 and a plurality of terminal units 28 connected via air ducts (not shown) to that AHU 26. AHU 26 is configured to receive outside air and supply the outside air (via a supply conduit 30) to one or more terminal units 28, which condition the air and supply it to the zones associated with the respective terminal unit(s) 28. The conditioned air is subsequently returned to AHU 26 via a return conduit 32 where it may be recycled or exhausted to the atmosphere. In the illustrated embodiment, terminal units 28 are fan coil units. However, terminal units 28 may be any suitable equipment that enables HVAC system 10 to function as described herein. For example, terminal units 28 may be fan coil units (FCUs), air terminal units (ATUs), variable air volume systems (VAV), or even AHUs.

Controller 18 may be a system-level controller configured to adjust operational setpoints of capacity generation plant 12, pump 14, and ventilation equipment 16 based on load conditions and a thermal demand of the building (which may be estimated with an average difference between a measurement of an actual room air temperature and a setpoint room air temperature), as is described herein in more detail. For example, a setpoint of plant 12 may be a fluid supply temperature, a setpoint of pump 14 may be a fluid pressure or flow, and a setpoint of equipment 16 may be a valve or damper opening, a fan speed, a supply air flow and/or temperature setpoint for that equipment for a room or zone. As used herein, the term controller refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 2:
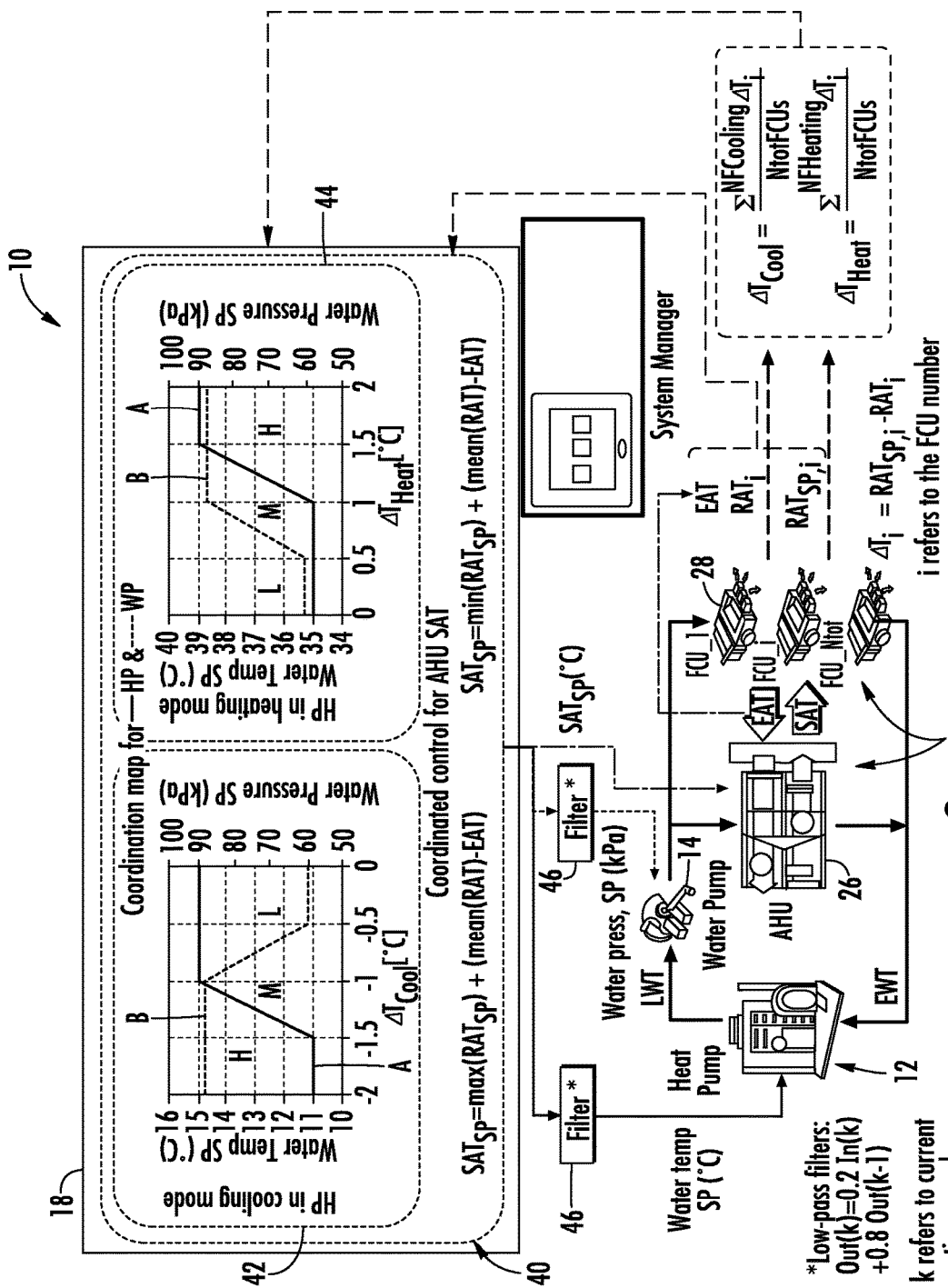
FIG. 2 is an exemplary control diagram that may be used for the system shown in FIG. 1.

In the exemplary embodiment, controller 18 includes or is in signal communication with a coordination module 40 to facilitate adjusting the setpoints of capacity generation plant 12, pump 14, and ventilation equipment 16. As illustrated in FIG. 2, coordination module 40 includes a cooling mode sub-module 42 and a heating mode sub-module 44. Cooling mode module 42 may be used when plant 12 is operated in a cooling mode, and second mode module 44 may be used when plant 12 is operated in a heating mode.

Modules 42, 44 may include reference/lookup tables, graphs, formulas, and the like to facilitate determining the operational setpoints for components 12, 14, 16 when plant 12 is operated in the cooling or heating mode. For example, as illustrated in FIG. 2, controller 18 determines setpoints for components 12 and 14 with a reference graph, and controller 18 determines setpoints for component 16 with a predetermined formula, all of which may be converted into formulas, look-up tables, or reference graphs.

Modules 42, 44 facilitate determining setpoints of plant 12, pump 14, and equipment 16 for a specified thermal demand and load conditions, and controller 18 subsequently adjusts components 12, 14, and 16 to operate at those setpoints. The setpoints may be updated at predetermined time intervals (e.g., every five minutes).

Figure 3:
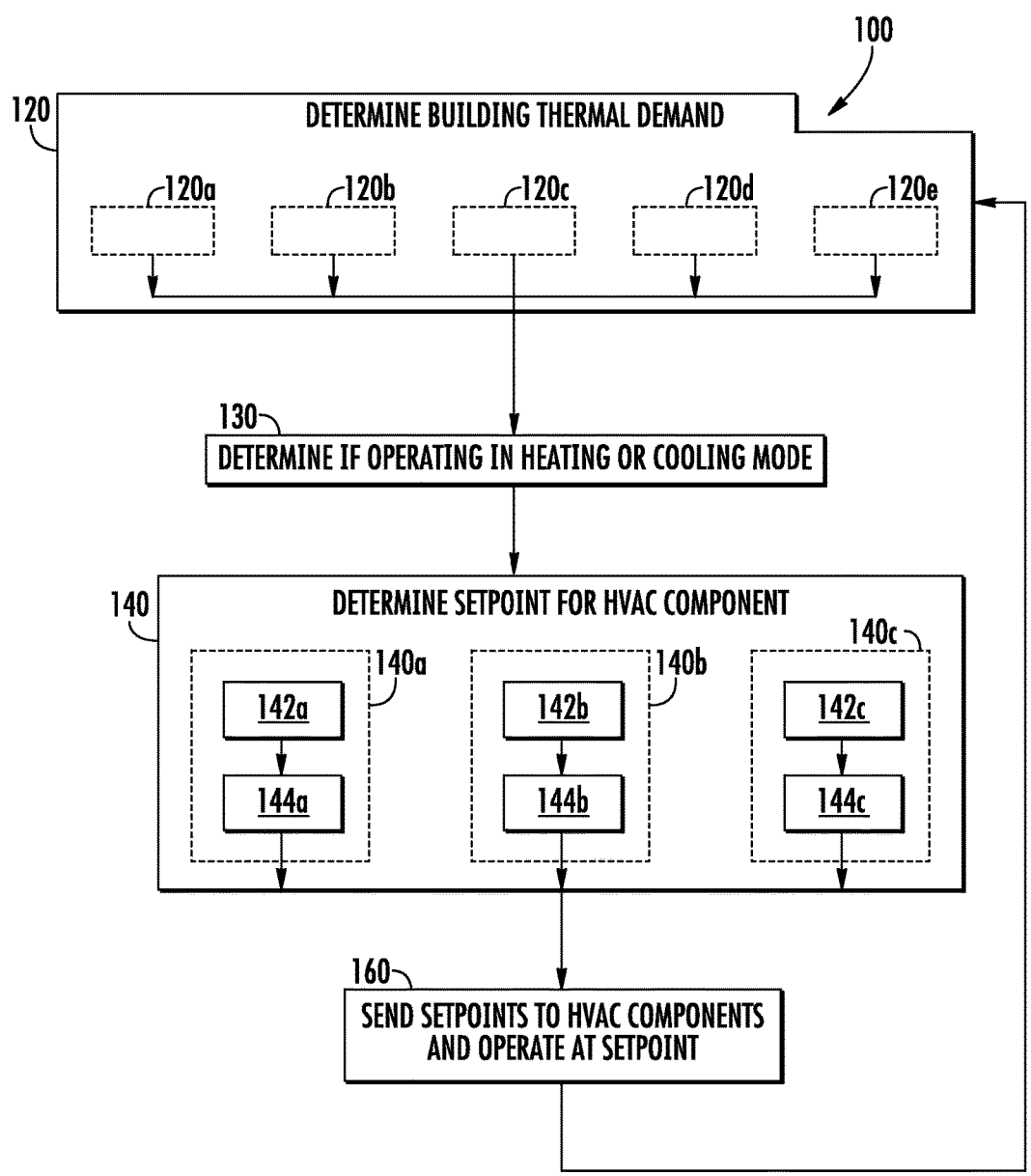
FIG. 3 is a flow chart illustrating an exemplary method of controlling the system shown in FIG. 1.

FIG. 3 illustrates an exemplary method 100 of controlling HVAC system 10 that generally includes steps 120, 140, and 160. At step 120, controller 18 determines the current building demand. At step 140, controller 18 determines operational setpoints for HVAC components (e.g., 12, 14, 16) that result in efficient operation of the entire HVAC system 10. At step 160, controller 18 sends one or more signals indicative of the determined setpoint(s) to the HVAC component(s). Method 100 may be executed at predetermined time intervals (e.g., every five minutes).

At step 120, controller 18 determines the current building demand, which is the total thermal heating or cooling demand required by the building/system served by the HVAC component under consideration (e.g., 12, 14, 16). The current building demand may be determined in various ways as represented by steps 120a-120e.

For example, at step 120a, controller 18 determines the current building demand by:

$$\Delta T_{Cool} = \frac{\sum^{NFCooling} \Delta T_i}{NtotFCUs} \text{ or } \Delta T_{Heat} = \frac{\sum^{NFHeating} \Delta T_i}{NtotFCUs}, \quad \text{Equation (1)}$$

where NFCooling or NFHeating are the set of terminal units 28 in cooling or heating demand, respectively, $\Delta T_i = RAT_{SP,i} - RAT_i$ is the difference between the room/zone air temperature setpoint $RAT_{SP,i}$ and the measured room air temperature $RAT_i$ (with i referring to the terminal unit number), and NtotFCUs being the total number of terminal units 28 being connected to and served by the HVAC component (i.e., the fixed number of terminal units 28, which is always larger or equal to the number of units 28 currently in heating or cooling demand).

At step 120b, controller 18 determines the current building demand by:

$$\Delta T_{Cool} = \frac{\sum^{NFCooling} V_i \Delta T_i}{V_{tot}} \text{ or } \Delta T_{Heat} = \frac{\sum^{NFHeating} V_i \Delta T_i}{V_{tot}}, \quad \text{Equation (2)}$$

where the current building demand is calculated the same as in Equation (1), except where the $\Delta T_i$ are weighted according to a sizing factor Vi for each terminal unit 28 (zone). These weighting factors Vi can be, for example, the unit rated capacity, the area or the volume of the zone served by the terminal unit 28, or a priority measure chosen by the building owner. The Vtot measure is the sum of all the weighting factors over all the relevant terminal units 28 installed in the building/system 10 (i.e. connected to the HVAC component being coordinated with these terminal units 28). For the particular cases where Vi is equal to 1, or the area of the zone or the volume of the zone served by that terminal unit 28, then Vtot is equal to the total number of terminal units 28 installed, or the total building surface or volume served (through the terminal units) by the coordinated HVAC component, respectively.

At step 120c, controller 18 determines the current building demand utilizing Equation (2), but where $\Delta T_i$ is replaced by another relevant measure of the demand of terminal unit 28 (in the relevant heating/cooling mode). All signals measured at the terminal unit 28 could potentially be leveraged to determine its demand. In particular, such value of demand may be: fan(s) speed(s), valve(s) or damper(s) openings, electrical heater(s) usage of the terminal unit, temperature(s) of the air going in or out of the unit, a measure of the capacity(ies) or power used by the terminal unit, a measure of temperatures and flows of fluids through the unit, or a combination thereof At step 120d, controller 18 determines the current building demand by utilizing HVAC component (e.g., plant 12, pump 14, equipment 16) measurements in addition to or instead of terminal unit measurements in steps 120a-120c. Such measurements of the HVAC component may be: the fan(s) speed(s), the valve(s) or damper(s) openings, the electrical heater(s) usage of the terminal unit, the temperature(s) of the air going in or out of the unit, the measure of the capacity(ies) or power used by the terminal unit, the measure of temperatures and flows of fluids through the unit, or a combination thereof.

At step 120e, controller 18 determines the current building demand by a combination of one or more of steps 120a-120d.

At step 130, controller 18 may determine if capacity generation plant 12 is operating in a cooling mode or a heating mode, which may be utilized to differentiate between using cooling mode module 42 and heating mode module 44. Operating in the heating or cooling mode may be the system's default/legacy decision, or it may be a decision utilizing building demand measure estimated as described with the different substeps of step 120. One example is given with the following set of rules: Start heating if ($\Delta T>0$ and $\Delta T_{Heat}>0.75°$ C.), start cooling if ($\Delta T<0$ and $\Delta T_{Cool}<-0.75°$ C.), stop heating if ($\Delta T<0$ or $\Delta T_{Heat}<0.25°$ C.), stop cooling if ($\Delta T>0$ or $\Delta T_{Cool}>-0.25°$ C.), changeover from cooling to heating if ($\Delta T>0$ and $\Delta T_{Heat}>0.5°$ C.), and changeover from heating to cooling if ($\Delta T<0$ and $\Delta T_{Cool}<-0.5°$ C.). $\Delta T_{Heat}$ and $\Delta T_{Cool}$ can be estimated as described with the different substeps of step 120, $\Delta T$ is estimated similarly but as the average demand over all the occupied zones (so regardless whether the corresponding terminal units 28 are in heating or cooling mode), and the threshold values ±0.25, 0.5, 0.75° C. can be adjusted by the building owner or via an appropriate scaling depending on the HVAC system installed and/or the building characteristics At step 140, controller 18 determines setpoints that will be sent to HVAC components by utilizing coordination module 40 and the determined building demand from step 120. Step 140 may include determining setpoints for capacity generation plant 12 (step 140a), pump 14 (step 140b), and ventilation equipment 16 (step 140c).

At step 140a, controller 18 determines one or more setpoints that will be sent to capacity generation plant 12 through sub steps 142a and 144a. At step 142a, controller 18 determines whether to use coordination sub-module 42 or sub-module 44, depending on whether plant 12 is operated in the cooling or heating mode, respectively. Then, at step 144a, controller 18 utilizes coordination module 40 (i.e., either sub-module 42 or 44 as chosen from step 142a) to determine the capacity generation plant setpoint based on the building demand determined in step 120. More specifically, at step 142a, controller 18 sets capacity generation plant 12 to a minimum effort setpoint below a low demand threshold (La), increases (e.g., linearly) the effort setpoint from low demand threshold (La) to a high demand threshold (Ha), and sets the maximum effort setpoint beyond the high demand threshold (Ha). For example, thresholds (La) and (Ha) define line (A) in the graphs illustrated in coordination module 40 (FIG. 2).

Demand thresholds (La) and (Ha) may be determined by operating terminal units 28 with hysteresis thresholds above or beyond which they start or stop their cooling/heating effort. In the exemplary embodiment, thresholds of terminal units 28 are used to determine (La) and (Ha) thresholds (e.g., values of temperature differences). Alternatively, demand thresholds (La) and (Ha) may be related to percentages of building level effort determined in step 120 (e.g., 25%, 50%, and 75% of an average valve opening or of plant 12 or HVAC system total capacity).

Similarly, at step 140b, controller 18 determines one or more setpoints that will be sent to fluid circulation pump 14 through sub steps 142b and 144b. At step 142b, controller 18 determines whether to use either coordination sub-module 42 or 44 depending on whether plant 12 is operating in the cooling or heating mode, respectively. Then at step 144b, controller 18 utilizes coordination module 40 (i.e., sub-module 42 or 44 as chosen in step 142b) to determine the capacity generation plant setpoint based on the building demand determined in step 120. More specifically, at step 142b, controller 18 sets pump 14 to a minimum effort setpoint below a low demand threshold (Lb), and increases (e.g., linearly (the effort setpoint from the low demand threshold (Lb) to a high demand threshold (Hb), and sets the maximum effort setpoint beyond the high demand threshold (Hb). For example, thresholds (Lb), and (Hb) define line (B) in the graphs illustrated in coordination module 40 (FIG. 2).

Demand thresholds (Lb) and (Hb) may be determined by operating terminal units 28 with hysteresis thresholds above or beyond which they start or stop their cooling/heating effort. In the exemplary embodiment, thresholds of terminal units 28 are used to determine (Lb) and (Hb) thresholds (e.g., values of temperature differences). Alternatively, demand thresholds (Lb) and (Hb) may be related to percentages of building level effort determined in step 120 (e.g., 25%, 50%, and 75% of an average valve opening or of the plant or HVAC system total capacity).

FIG. 2 illustrates an exemplary threshold choice for which (Lb)=(L), (Hb)=(La)=(M), and (Ha)=(H), wherein (L) is a global Low Threshold, (M) is a global Medium Threshold, and (H) is a global High Threshold. This exemplary choice implies that the effort setpoint of fluid circulation pump 14 is increased to its maximum before the effort setpoint of plant 12 is increased.

At step 140c, controller 18 determines one or more setpoints that will be sent to ventilation equipment 16 that treats fresh air from outside prior to sending it to the building such as AHU 26, which will be used for exemplary purposes. At step 142c, controller 18 determines whether to use either coordination sub-module 42 or 44 depending on whether plant 12 is operated in the cooling or heating mode, respectively. A third alternative may be used if plant 12 is off, as described herein in more detail. At step 144c, controller 18 determines a supply air temperature setpoint (SATsp) of AHU 26 sufficient to prevent overcooling or overheating a specific area/zone (in the determined heating/cooling mode), as describe herein in more detail.

When capacity generation plant 12 is operated in the cooling mode, SATsp is determined by:

$$SATsp = max(RATsp) + \text{air duct losses/gains}, \quad \text{Equation (3)}$$

where max(RATsp) is the maximum room air temperature setpoint amongst all areas/zones served by that AHU, and air duct losses/gains are determined by:

$$\text{Air duct losses/gains} = (mean(RAT) - EAT) * SF/EF, \quad \text{Equation (4)}$$

where mean(RAT) is the mean temperature amongst all the areas/zones from which the air is extracted and sent to the AHU (which average can be weight-averaged for instance with the zones areas or volumes or flow of extracted air), EAT is the temperature of the air extracted from the rooms by the AHU and measured at the AHU, SF is the flow of air supplied by the AHU to the building, and EF is the flow of air extracted by the AHU from the building. If SF and EF are maintained close together by design SF/EF can be approximated by the value 1.

When capacity generation plant 12 is operated in the heating mode, SATsp is determined by:

$$SATsp = min(RATsp) + \text{air duct losses/gains}, \quad \text{Equation (5)}$$

where min(RATsp) is the minimum room air temperature setpoint amongst all areas/zones served by that AHU.

When capacity generation plant 12 is off, SATsp is determined by:

$$SATsp = mean(RATsp) + \text{air duct losses/gains}, \quad \text{Equation (6)}$$

where mean(RATsp) is the average room air temperature setpoint amongst all areas/zones served by that AHU.

At step 160, controller 18 sends the determined setpoints to the associated HVAC component and operates those components at the determined setpoints. For example, the setpoint(s) determined for step 140a are sent to capacity generation plant 12, the setpoint(s) determined for steps 140b are sent to fluid circulation pump 14, and the setpoint(s) determined for steps 140c are sent to ventilation equipment 16 that treats outside air prior to sending throughout the building. In some embodiments, a filter 46 (FIG. 2) may be used to smooth the setpoint change to facilitate preventing operational issues that may result from a sudden, large setpoint change. Control may then return to step 120. As such, controller 18 is programmed to perform the steps described herein.

Described herein are systems and methods for controlling HVAC system components such as a capacity generation plant, a fluid circulation pump, and ventilation equipment. The control coordinates the effort of the various components with respect to an aggregated measure of the demand on terminal units that are connected to the components. The control obtains an estimate of the heating/cooling aggregated whole building demand, computes component setpoints based on the building demand, filters the setpoints, and sends the setpoints to the associated components to operate those components at the determined setpoints. As such, the components setpoints are periodically adjusted to meet the building demand resulting in more efficient component operation and energy savings.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments have been described, it is to be understood that aspects of the disclosure may include only some of the described embodiments. Accordingly, the disclosure is not to be seen as limited by the foregoing description, but is only limited by the scope of the appended claims.

The invention claimed is:

1. An HVAC system comprising:
   a plurality of HVAC components;
   a plurality of terminal units, at least one terminal unit of the plurality of terminal units associated with each HVAC component of the plurality of HVAC components;
   a control system comprising:
   a coordination module; and
   a controller operably associated with the coordination module and in signal communication with the plurality of HVAC components and associated terminal units, the controller configured to:
   determine an aggregated thermal demand of the HVAC system;
   determine, with the coordination module, an operational setpoint for at least one HVAC component of the plurality of HVAC components based on the determined aggregated thermal demand; and
   send a signal indicative of each determined operational setpoint to each associated HVAC component of the plurality of HVAC components;
   wherein the plurality of HVAC components comprises a capacity generation plant, a fluid circulation pump, and ventilation equipment;
   wherein the coordination module includes a cooling mode module and a heating mode module;
   wherein determining the operational setpoint for at least one of the plurality of HVAC components comprises at least one of:
   (i) determining one or more setpoints to be sent to the capacity generation plant, wherein the controller is configured to set the capacity generation plant to a minimum effort setpoint below a low demand threshold (La), increase the effort setpoint from the low demand threshold (La) to a high demand threshold (Ha) and to set a maximum effort setpoint beyond the high demand threshold (Ha);
   (ii) determining one or more setpoints to be sent to the fluid circulation pump, wherein the controller is configured to set the pump to a minimum effort setpoint below a low demand threshold (Lb), increase the effort setpoint from the low demand threshold (Lb) to a high demand threshold (Hb) and to set a maximum effort setpoint beyond the high demand threshold (Hb);

(iii) determining one or more setpoints to be sent to the ventilation equipment that treats fresh air from outside, wherein when the capacity generation plant is operated in cooling mode, a supply air setpoint (SATsp) is determined by the sum of the maximum room air temperature setpoint amongst all zones and the air duct losses/gains, and wherein when the capacity generation plant is operated in heating mode, a supply air setpoint (SATsp) is determined by the sum of the minimum room air temperature setpoint amongst all zones and the air duct losses/gains.

2. The HVAC system of claim 1, wherein the controller is configured to update the operational setpoints at predetermined time intervals.

3. The HVAC system of claim 1, wherein the ventilation equipment comprises an air handling unit.

4. The HVAC system of claim 1, wherein determining the aggregated thermal demand of the HVAC system comprises determining an aggregated thermal demand of the one or more terminal units.

5. A method of controlling an HVAC system having a plurality of HVAC components and a plurality of terminal units, at least one terminal unit of the plurality of terminal units associated with each HVAC component of the plurality of HVAC components, a coordination module, and a controller operably associated with the coordination module and in signal communication with the plurality of HVAC components and the plurality of terminal units, the method comprising:
   determining an aggregated thermal demand of the HVAC system;
   determining, with the coordination module, an operational setpoint for at least one HVAC component of the plurality of HVAC components based on the determined aggregated thermal demand; and
   subsequently operating each HVAC component of the plurality of HVAC components at the determined operational setpoint;
   wherein the plurality of HVAC components comprises a capacity generation plant, a fluid circulation pump, and ventilation equipment;
   wherein the coordination module includes a cooling mode module and a heating mode module;
   wherein determining the operational setpoint for at least one of the plurality of HVAC components comprises at least one of:
   (i) determining one or more setpoints to be sent to the capacity generation plant, wherein the controller is configured to set the capacity generation plant to a minimum effort setpoint below a low demand threshold (La), increase the effort setpoint from the low demand threshold (La) to a high demand threshold (Ha) and to set a maximum effort setpoint beyond the high demand threshold (Ha);
   (ii) determining one or more setpoints to be sent to the fluid circulation pump, wherein the controller is configured to set the pump to a minimum effort setpoint below a low demand threshold (Lb), increase the effort setpoint from the low demand threshold (Lb) to a high demand threshold (Hb) and to set a maximum effort setpoint beyond the high demand threshold (Hb);
   (iii) determining one or more setpoints to be sent to the ventilation equipment that treats fresh air from outside, wherein when the capacity generation plant is operated in cooling mode, a supply air setpoint (SATsp) is determined by the sum of the maximum room air temperature setpoint amongst all zones and the air duct losses/gains, and wherein when the capacity generation plant is operated in heating mode, a supply air setpoint (SATsp) is determined by the sum of the minimum room air temperature setpoint amongst all zones and the air duct losses/gains.

6. The method of claim 5, further comprising updating the operational setpoints at predetermined time intervals.

7. The method of claim 5, wherein the ventilation equipment comprises an air handling unit.

8. The method of claim 5, wherein the operational setpoint for the capacity generation plant is a water temperature, the operational setpoint for the pump is a water pressure, and the operational setpoint for the air handling unit is a supply air temperature.

9. The method of claim 5, wherein said determining an aggregated thermal demand comprises determining an aggregated thermal demand of the plurality of terminal units.

10. The method of claim 5, wherein said determining an aggregated thermal demand of the HVAC system comprises:
   determining if the capacity generation plant is being operated in a cooling mode or a heating mode;
   measuring an air temperature of the zone; and
   dividing the product of a number of the plurality terminal units operating in the cooling mode or the heating mode and the difference between a zone air temperature setpoint and a measured zone air temperature, by the total number of the plurality of terminal units associated with the plurality of HVAC components.

* * * * *